United States Patent

[11] 3,611,336

| [72] | Inventor | Frank C. F. Chen<br>Santa Ana, Calif. |
|------|----------|---------------------------------------|
| [21] | Appl. No. | 35,725 |
| [22] | Filed | May 8, 1970 |
| [45] | Patented | Oct. 5, 1971 |
| [73] | Assignee | Technomation Controls Corporation<br>Orange, Calif. |

[54] ELECTRONIC OVEN TEMPERATURE MONITORING SYSTEM
13 Claims, 8 Drawing Figs.

[52] U.S. Cl. ................................................. 340/233,
73/352, 99/344, 99/421 TP, 126/299, 338/38
[51] Int. Cl. ....................................................... F24c 15/00,
G01r 1/02, G01r 1/14
[50] Field of Search........................................... 340/227,
227.1, 233, 421; 73/343, 352, 358; 126/190, 299;
99/342, 344, 421 TP; 219/392, 393; 338/28, 30

[56] References Cited
UNITED STATES PATENTS

| 2,510,526 | 6/1950 | Smith | 99/331 |
| 2,635,137 | 4/1953 | Basham | 317/149 |
| 2,664,489 | 12/1953 | Dickey | 99/421 TP |
| 2,925,572 | 2/1960 | Boddy | 338/28 |
| 2,984,236 | 5/1961 | McDonough | 126/198 X |
| 3,132,638 | 5/1964 | Habe et al. | 126/19 |
| 3,305,734 | 2/1967 | Buttenhoff | 340/233 UX |
| 3,494,196 | 2/1970 | Moussette | 340/233 X |

*Primary Examiner*—John W. Caldwell
*Assistant Examiner*—Scott F. Partridge
*Attorney*—Fowler, Knobbe & Martens

ABSTRACT: A quickly installable self-contained temperature-monitoring system for existing ovens featuring a U-shaped collar which fits between the oven opening and its partially opened door to provide access for meat temperature probes into the interior of the oven. The probes extend into the oven from the collar and are connected to individual temperature monitoring circuits and warning devices on the collar. Operational amplifier techniques are employed in the temperature-monitoring circuits for an accuracy within 2° F.

PATENTED OCT 5 1971

INVENTOR.
FRANK C. F. CHEN

BY
FOWLER, KNOBBE
& MARTENS

ATTORNEYS.

INVENTOR.
FRANK C. F. CHEN
BY FOWLER, KNOBBE & MARTENS
ATTORNEYS.

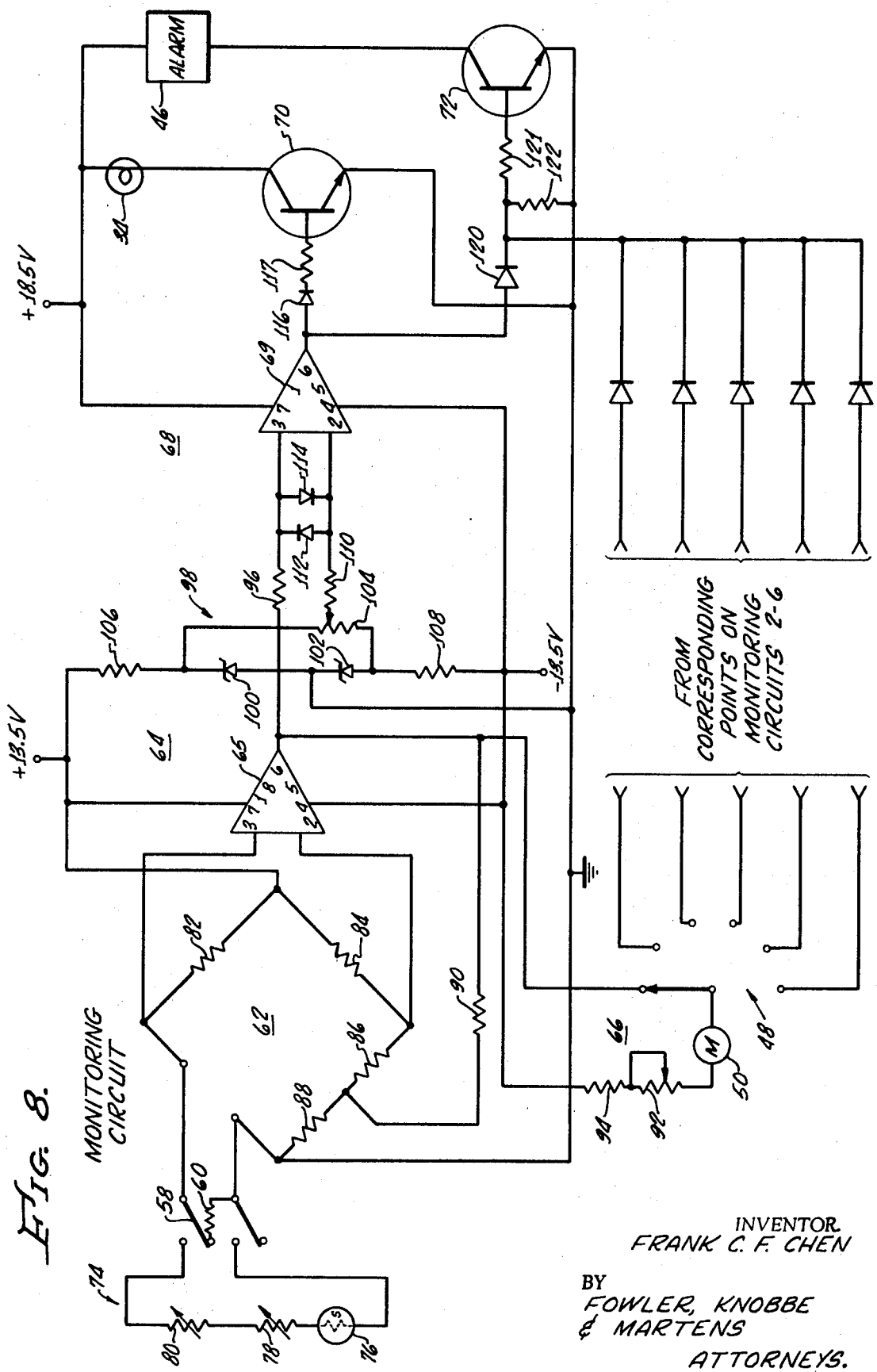

ELECTRONIC OVEN TEMPERATURE MONITORING SYSTEM

The present invention is directed to temperature-monitoring circuits and in particular to a self-contained system for monitoring meat temperatures inside commercial ovens.

There has been a rapid growth in recent years in the type of restaurants which specialize in the preparation of a particular type of meat, such as fried chicken or roast beef. Particularly in the case of roast beef, it is desirable to cook the meat to a preselected temperature, no more, no less. If the meat is not brought to a sufficiently high temperature, it will not meet health standards. If, on the other hand, the meat temperature rises too high the meat will shrink and its taste and texture will deteriorate. Many of the commercial ovens presently in use lack a temperature monitoring system so that, if meat temperature is to be monitored it must be done by conventional meat thermometers of the type consisting of a sharp probe having a temperature gauge at its end. Such meat thermometers are inaccurate, short-lived and require constant watching and repeated opening of the oven door to determine when the meat has reached a desired temperature.

The present invention disposes of the need for using conventional meat thermometers and replaces these with an integrated system wherein only temperature probes extend into the oven and all other parts of the system are kept away from its hot environment. As a result, the durability of the system is greatly improved and temperature reading is made effortless yet accurate.

Basically, the invention resides in a method of and a novel apparatus for converting an existing oven for operation with a temperature-monitoring circuit wherein temperature probes inside the oven are connected through a cable harness to temperature indicating and monitoring devices outside the oven without structurally modifying the oven. In accordance with the method, a collar is removably fastened between the opening of the oven and its partially open door so as to form a seal between them. Additionally, the collar defines a passage from the inside of the oven to the outside and the cable harness connecting the temperature probes with the temperature-indicating devices is led from the inside of the oven to the outside through this passage.

In its preferred embodiment the system includes a plurality of probes for insertion into individual pieces of meat being prepared and a temperature-monitoring circuit having means for detecting with high accuracy the instant when a predetermined temperature is sensed by each probe.

It is another advantage of the present invention that the temperature monitoring system is self-contained and may be installed into existing ovens without modifying them structurally. When used in this manner the temperature-monitoring system of the present invention includes a hollow adapted collar shaped to fit between the opening of the oven and its door so as to form a seal between them. Inside the collar, means are provided for establishing an electrical circuit between each heat sensing probe inside the oven and a temperature-monitoring circuit outside the oven. In the preferred embodiment of the invention the temperature-monitoring circuit is contained in a housing which is carried by the collar.

The system of the present invention is ideally adapted for installation into an existing oven of the type having a rectangular door hinged along one edge of the oven opening. For use with such an oven, the collar which fits between the oven opening and the door is U-shaped and is provided with a transverse member dimensioned to extend along the edge of the oven opening opposite the edge along which the door is hinged. A pair of arms extend at right angles from the transverse member toward the edge along which the door is hinged. The arms are wedge shaped so as to fit between the oven and its door when the latter is slightly open so that the collar forms a seal between the oven and its partially opened door.

The collar of the present invention also finds utility in providing a heat seal between the oven and its door when the door is partially open, thereby increasing the holding capacity of the oven. Moreover, the heat sealing collar, when in place may be used to provide a passage for wiring that is to go into the oven to electrical temperature probes therein. This can be accomplished by leaving a small gap between the oven and the collar or between the door and the collar or by simply providing an opening through the collar itself.

While the location of the monitoring circuit and the indicating devices is not critical, it has been found particularly effective to house all of the electronic circuits for monitoring the temperatures sensed by the several probes in a circuit box attached to the outside of one arm of the collar and to mount the indicating devices, preferably lamps, along the transverse member so that each lamp may be associated with a particular one of the temperature-sensing probes.

The provision of a dependable and accurate temperature-monitoring system is an additional feature of the invention. In keeping with this aspect of the invention, the temperature-monitoring system includes a plurality of electrical temperature sensors, each of which has a resistance whose value changes with temperature. An indicating device, such as a lamp, is provided for each temperature sensor and each indicating device is controlled by an individual monitoring circuit having a resistance bridge of which a respective one of the temperature sensors is a part, an amplifier connected to produce a signal proportional to the output of the bridge, and a threshold circuit for actuating the indicating device when the output of the amplifier exceeds a preset limit, i.e., when the desired meat temperature has been reached at one of the temperature sensors. An audible alarm may also be provided to give an additional warning when the temperature sensed by any of the probes reaches a preset limit.

A more complete understanding of the invention may be had by reference to the following detailed description when taken in conjunction with the drawings wherein:

FIG. 8 is a diagram of a preferred temperature-monitoring circuit.

Figure 1:
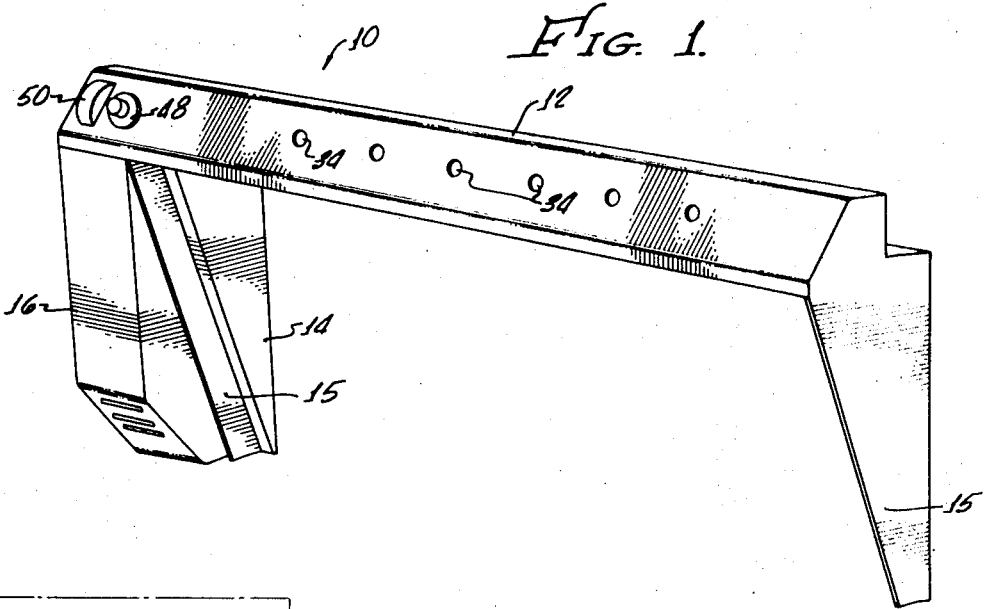
FIG. 1 is a perspective view of the adapter collar prior to insertion into the oven opening.

Although only one embodiment of the invention is shown in the drawings and described in the following specification, it should be understood that the invention is not limited to the specific embodiment described, but is capable of modification, without departing from the spirit of the invention.

Figure 2:
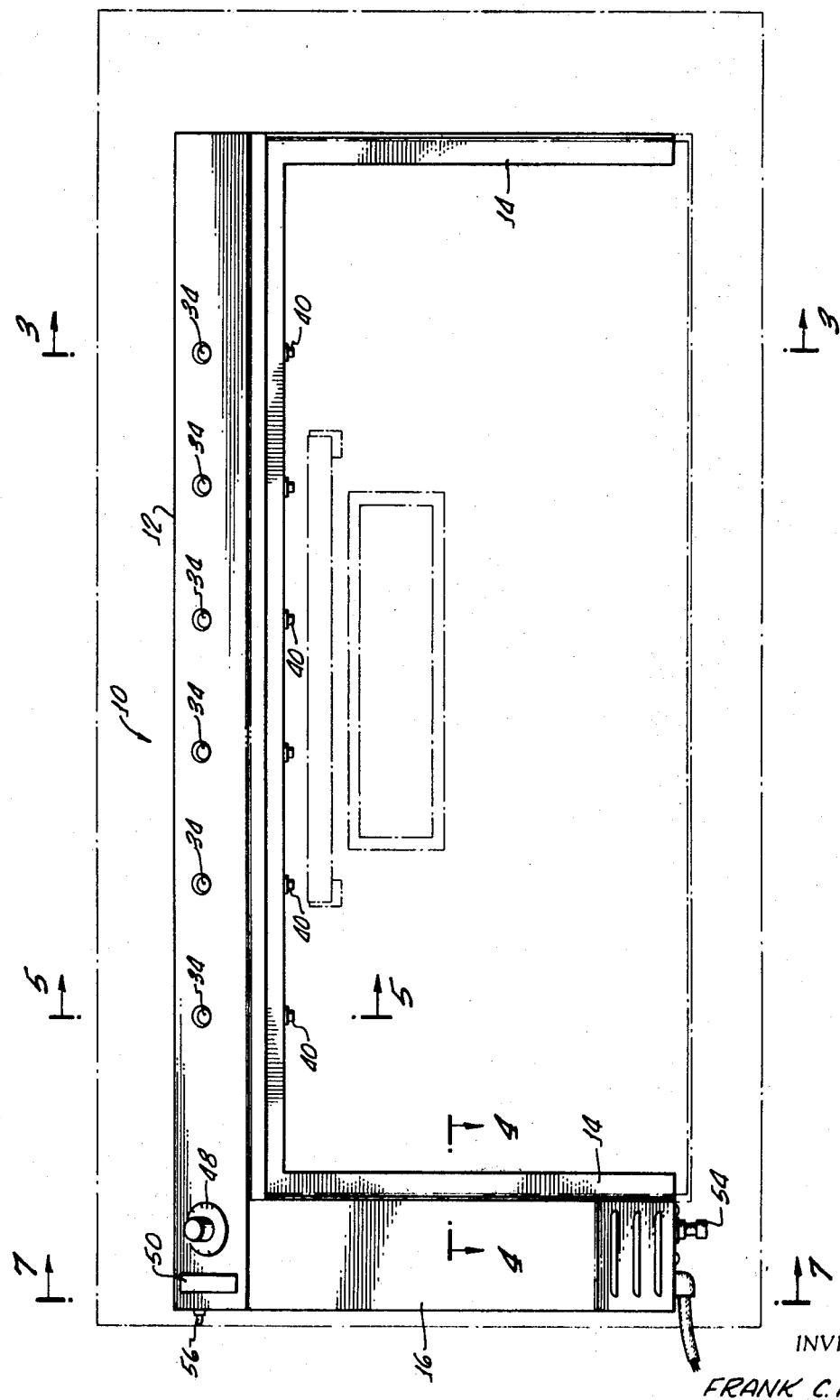
FIG. 2 is a front elevation view of the adapter collar installed in the oven shown by the dotted lines.

An exemplary embodiment of the present invention is shown in FIGS. 1 and 2. A hollow U-shaped collar 10 provides a seal between an oven and its hinged door and comprises a hollow transverse member 12 dimensioned to extend along the edge of the oven opening opposite the edge along which the doors hinge and a pair of wedge-shaped arms 14 extending at right angles from the transverse member and spaced apart to extend along opposite edges toward the edge along which the door is hinged. One of the arms 14 is spaced inwardly from one end of the transverse member 12 to allow attaching a circuit box 16 which contains the electronic circuits associated with the temperature-monitoring device.

Figure 3:
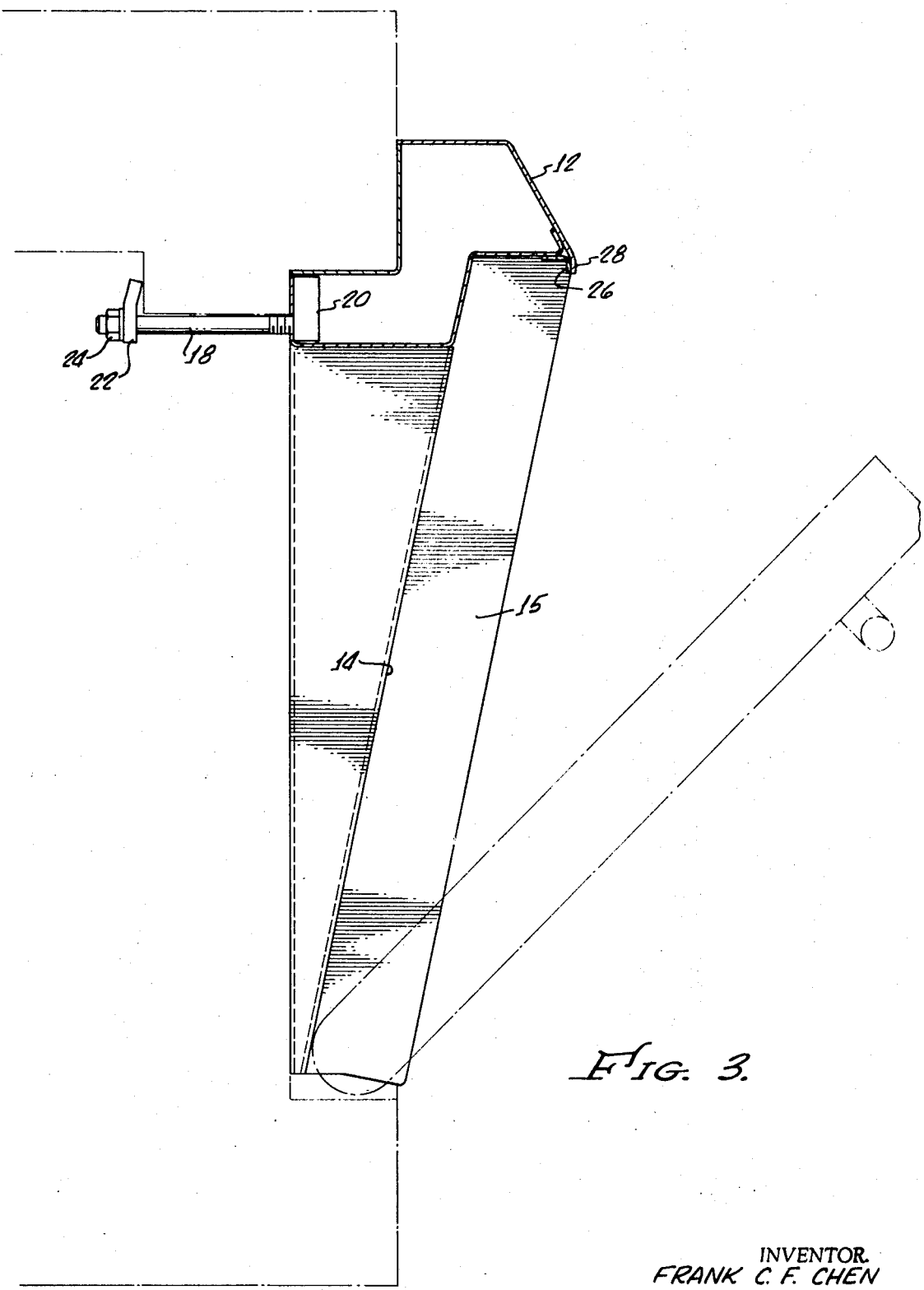
FIG. 3 is a cross-sectional view of the collar taken on the line 3—3 of FIG. 2.

Referring next to FIG. 3, broken lines define the front of a commercially available oven with its door in a partially open position. The transverse member 12 is formed to describe a generally S-shaped hollow confine in cross section, the rear of the transverse member being shaped to provide a vertical surface which conforms to the upper face of the oven and an inwardly extending portion abutting the inside lip of the oven against which the door normally resides when in its closed position. Spaced along the rear of the transverse member 12 are bolts 18 whose heads 20 are anchored inside the transverse member 12 and whose shanks pass through dog flanges 22 so that the tightening of a nut 24 on the end of the bolt forces the rear of the transverse member against the face of the oven to provide a seal between them.

An L-shaped strip 26 extends along the length of the transverse member 12 under its front edge to provide a rigid joint along the closure and, with a lip extension 28 serves to conceal the space between the upper edge of the door and the transverse member against which it resides.

Figure 4:
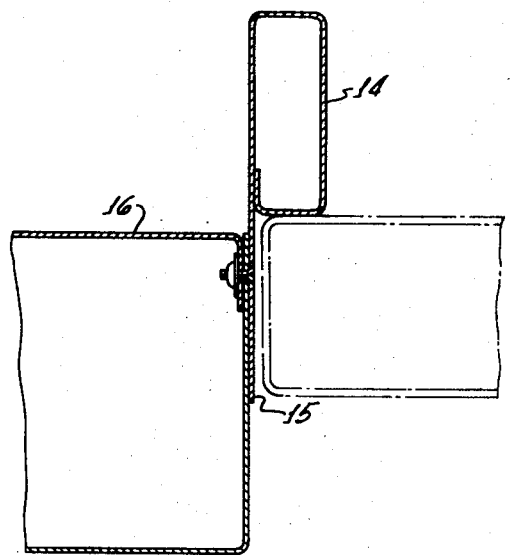
FIG. 4 is a cross-sectional view taken on the line 4—4 of FIG. 2.

As best shown in FIGS. 1, 3, and 4, the depending arms 14 are attached to the transverse member 12 and extend downward, toward the hinged edge of the oven door. The arms 14 are wedge shaped so that when the collar 10 is installed, the outer edges of the oven door will abut the front surface and the oven the rear surface of the wedge. Referring to FIG. 4, the wedge-shaped arms have a rectangular cross-sectional area which decreases from a maximum adjacent to the transverse member 12 to a minimum at the extreme lower edge of the arm 14. The outside face of the wedge extends away from the oven front so as to form a shield 15 to cover the outer ends of the oven door for sake of appearance, one outer face also providing a surface for attaching the circuit box 16 which is essentially rectangular and whose bottom outer corners are truncated for purposes of symmetry with the sloping front of the transverse member 12. Access is provided from the circuit box 16 to the transverse member 12 in order to allow certain temperature-monitoring means which are in the box to be connected to one or more external sensors through the transverse member.

Figure 7:
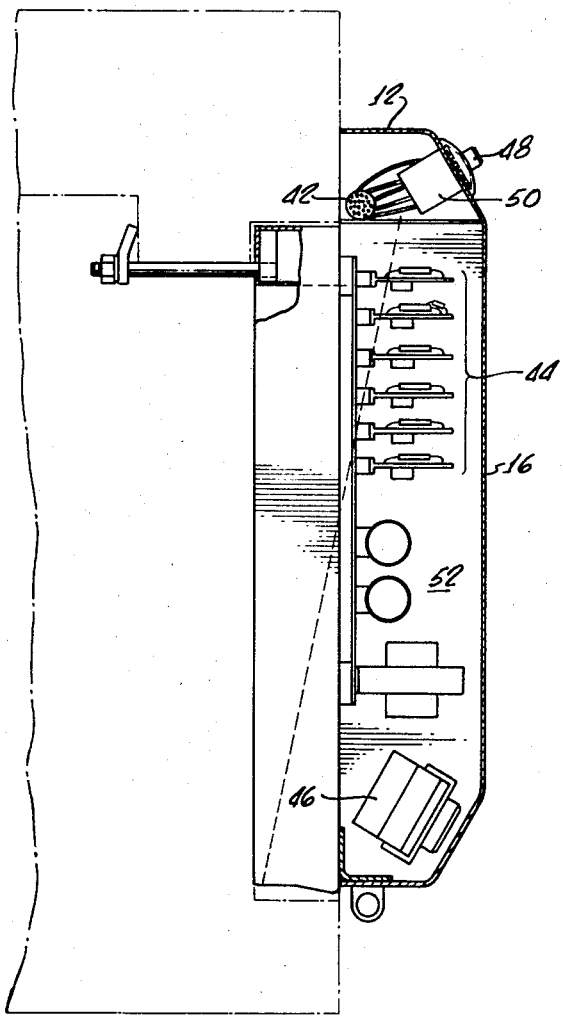
FIG. 7 is a cross-sectional view of the collar taken on the line 7—7 of FIG. 2.
Figure 5:
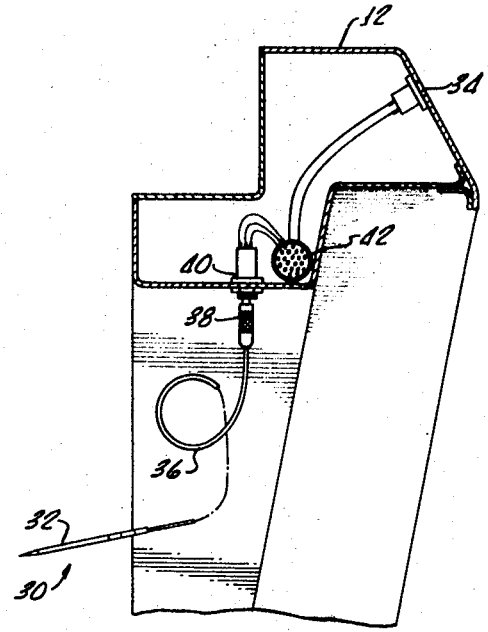
FIG. 5 is a cross-sectional view taken on the line 5—5 of FIG. 2.

Referring to FIGS. 2 and 5, in the exemplary embodiment there are six sensors, each being in the form of a probe 30 comprised of temperature-sensitive electrical elements, not shown, enclosed in a pointed tube 32 which is inserted into the meat. Each probe 30 is connected to a respective display device, shown as a series of indicator lamps 34 seated in cutouts in the transverse member 12. In order to provide a responsive electrical contact between each probe 30 and its associated indicator lamp 34, each probe is provided with a probe lead 36 connected at one end to the temperature-sensitive elements within the probe and to an electric plug 38 at the other end. The plug 38 is inserted into a jack 40 on the underside of the transverse member 12 below its respective indicator lamp 34. Wires from the respective jacks 40 enter a cable harness 42 in the hollow transverse member 12 and are routed to the inputs of respective ones of a stack of six electrical temperature-monitoring circuit boards 44 located in the circuit box 16, as shown in FIG. 7. Each of the circuit boards 44 has an output which is connected through the cable harness 42 to a respective one of the indicator lamps 34 and, in a manner explained hereinafter with reference to FIG. 8, is operative to actuate its associated indicator lamp when a given one of the probes 30 senses a preselected temperature. Since the circuit box 16 is outside the oven, while the probes 30 are inside it, it is seen that the collar 10 provides a passage for leading a set of wires from the probes within the oven to temperature-monitoring and indicating devices outside the oven without in any way requiring a structural alteration therein.

The DC voltage levels required to operate the circuit boards 44 are produced by power supply components 52 located under the boards and receiving current through an ON-OFF switch 54 at the bottom of the box 16 (FIG. 2). An indicator lamp 56 at the end of the transverse member 12 is connected to glow when the power is on. While there are six temperature-monitoring circuits in the circuit box 16 the outputs of all six share a common audible alarm 46, which is also located in the circuit box, thereby causing the alarm to sound when any one of the probes 30 senses the predetermined temperature. Additionally, connections are made from the outputs of the six circuits through a six position selector switch 48 located on the front of the transverse member 12 to an ammeter 50 located adjacent to the switch 48 (FIG. 6) and calibrated to indicate the temperature sensed by a selected probe.

An exemplary temperature-monitoring circuit is shown in FIG. 8. In the illustrated embodiment there are six monitoring circuits one on each of the circuit boards 44, but since all are identical, only one is shown and explained while connections from corresponding points on the other circuits are indicated when necessary.

Figure 6:
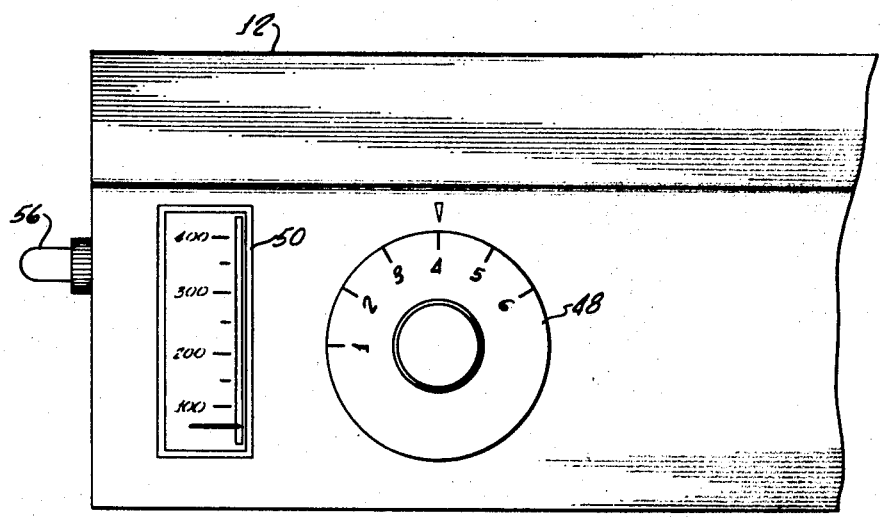
FIG. 6 is an enlarged view of the upper left-hand portion of the collar showing the power-on indicator, probe temperature indicator and probe selector switch.

Briefly, each temperature-monitoring circuit is comprised of a resistance bridge 62 which includes as one of its branches the temperature probe 30 to which the bridge is connected through the harness 42 as discussed previously with reference to FIG. 7. The output of the resistance bridge 62 is connected to an amplifying stage 64 whose output in turn is applied to a voltage threshold-detecting stage 68. The threshold-detecting stage 68 produces an output when the temperature sensed by the probe 30 reaches a preset limit and this output is applied to turn on a normally off transistor 70 in series with the indicator lamp 34 associated with the probe 30. Additionally, the threshold detectors of all of the monitoring circuits are also connected to turn on a normally off transistor 72 in series with the audible alarm 46. Similarly, the outputs of all of the amplifying stages 64 are fed to a metering circuit 66 which includes the temperature-calibrated ammeter 50 on the front of the transverse member 12 (FIG. 6).

More specifically, the probe 30 contains probe elements 74 which are comprised of a thermistor 76 connected in series with a pair of trimming resistors 78 and 80. Three arms of the bridge 62 are formed by resistors 82, 84, and 86, 88 respectively. The probe components 76, 78, and 80 are connected to the bridge 62 as its fourth arm through the jack-plug combination 38 and 40 (FIG. 5). The jack 40 has a pair of normally closed contacts 58 through which a probe-simulating resistor 60 is connected as the fourth bridge arm to prevent damage to the amplifying stage 64 due to excessive bridge unbalance when the plug 38 is not in the jack 40.

In operation, with the jack 38 in the plug 40, as the temperature sensed by the probe 30 increases, the resistance of the thermistor 76 also increases. This causes a change in the balance of the bridge 62, whose output is applied to inputs 2 and 3 of an operational amplifier 65. The output of the amplifier 65 at its terminal 6 varies linearly with the temperature sensed by the probe 30 and is fed back to the bridge 62 at the junction of the resistors 86 and 88 through a feedback resistor 90.

The output of the amplifier 65 at terminal 6 is additionally fed to the metering circuit 66 through the contacts of the selector switch 48 so as to permit any one of the six monitoring circuits to be connected to the meter 50 for a direct reading of the temperature sensed by any particular one of the probes 30. The metering circuit 66 is calibrated by a potentiometer 92 in series with a trimming resistor 94 so the temperature sensed may be accurately displaced.

The operational amplifier output at terminal 6 is also supplied to input 3 of an operational amplifier 69 in the threshold detector 68 through a resistor 96. A biasing circuit 98 is connected to input 2 of the threshold detector amplifier 69 in the following manner. A pair of zener diodes 100 and 102 in series with bias resistors 106 and 108 are connected between the −13.5- and +13.5-volt terminals and serve to maintain a constant voltage of 10 volts across a potentiometer 104 connected across the zener diodes, the zener diodes being connected to ground at their junction. A voltage reference level ranging between −5 volts and +5 volts is thus available at the wiper of the potentiometer 104 and is applied through a resistor 110 to input terminal 2 of the threshold detector amplifier 69. As a result, the monitoring circuit may be calibrated so as to cause its threshold detector 68 to be triggered at a desired probe temperature by adjusting the position of the wiper on the potentiometer 104 so that a zero output appears across inputs 2 and 3 of the threshold detector at that temperature. In the embodiment shown, the desired temperature may be set between 110° to 160° F. A pair of protective diodes 112 and 114 connected across the inputs 2 and 3 of the threshold detector 68 serve to limit the voltage appearing across them to about 0.6 volt.

The output of the threshold detector 68 is applied through an isolated diode 116 in series with a resistor 117 to the lamp driver transistor 70 which controls current through the indicator lamp 34. The output of the threshold detector 68 is also applied through a second isolation diode 120 in series with a resistor 121 to the alarm drive transistor 72 which additionally receives the outputs of the threshold detectors 68 of the monitoring circuits 2 through 6.

In operation, the lamp driver 70 and the alarm driver 72 are nonconductive until any one of the six meat temperature probes 30 senses the preselected temperature. At this time the threshold detector 68 is actuated by the correct level of output from the operational amplifier 65 cooperating with the voltage supplied by the bias circuit 98 causing the audible alarm 46 to be triggered. The indicator lamp 34 associated with the particular monitoring circuit will identify the sensing temperature probe 30.

Once the correct probe has been identified, removal of the plug 38 deactivates the lamp 34 and the audible alarm 46 since the auxiliary resistor 60 is automatically placed back into the circuit in place of the probe element 74, returning the monitoring circuit to its quiescent state through the balance of the resistance bridge 62.

The above cycle of operation will be repeated until each temperature-sensing probe is removed from its associated monitoring circuit.

Summarizing the foregoing description, what has been contributed by the present invention is a temperature-monitoring system which can be installed in a matter of minutes in existing ovens without structurally altering them. While the installation of such a temperature-monitoring system would enhance the utility of a home oven, in which event only a single temperature probe and a single temperature-monitoring circuit would be provided, its greatest utility is seen to be in commercial installations. Meat loss through wasteage is reduced by the continuous, accurate, and automatic monitoring of meat temperature. Maintenance expenses are reduced because all components that are vulnerable to high temperatures are kept outside of the oven. Moreover, even if the temperature-monitoring system should require repair, oven down-time may be eliminated by simply replacing the entire system with a substitute until repairs are made.

As can be seen from the above description, once the collar has been installed, the probes inserted into the meat and associated circuitry and power applied, the temperature monitoring is completely automatic, requires no personal attention and is extremely accurate due to the operational amplifier techniques employed in conjunction with the temperature-sensitive electrical elements in the probe. The indications signifying that a piece of meat has reached the proper temperature are both audible and visual so as to ensure timely detection by operating personnel.

It will be apparent that the collar of the present invention need not be used exactly in the manner shown to facilitate the installation of a temperature-monitoring system into an existing oven without modifying it. Thus, for example, the collar and the temperature-monitoring system could be separate. In such a case, the harness connecting the temperature probes to the indicating portions of the system could pass from the inside of the oven to the outside through a gap left either between the collar and the partially open door or between the collar and the oven or through a passage left in the collar itself.

APPENDIX

The following components and components values provided an accuracy of better than 2 percent in detecting a desired temperature by means of the exemplary circuit of FIG. 8, with the operational amplifier 65 being biased by +13.5 and −13.5 volts and the threshold detector 68 being biased by +18.5 volts.

Resistors (In Ohms, ¼ watt 10 percent except when noted)

| | | |
|---|---|---|
| | 60 | 2.2K |
| | 76 | 4.7K (at Room Temp; (½w) |
| | 78 | 800 (½w) |
| | 80 | 50 (½w) |
| | 82 | 6.19K(1%) |
| | 84 | 6.19K (1%) |
| | 86 | 5.9K (1%) |
| | 88 | 301 (1%) |
| | 90 | 2.61K (1%) |
| | 92 | 20K |
| | 94 | 2.2K |
| | 96 | 20K (1%) |
| | 104 | 20K |
| | 106 | 4.7K |
| | 108 | 4.7K |
| | 110 | 20K |
| | 117 | 4.7K |
| | 121 | 15K |
| | 122 | 10K |
| Diodes | | |
| | 100 (Zener) | 1N 5232 |
| | 102 (Zener) | 1N 5232 |
| | 112 | 1N 914 |
| | 114 | 1N 914 |
| | 116 | 1N 914 |
| | 120 | 1N 914 |
| Transistors | | |
| | 70 | 2N 3904 |
| | 72 | 2N 3904 |
| Amplifiers | | |
| | 64 | Fairchild uA 709 |
| | 68 | Fairchild uA 709 |

What is claimed is:

1. An adapter for permitting an electrical heat sensor to be used with an existing oven while it is in operation without structurally modifying it, said adapter comprising:
    a. a collar shaped to fit between the opening of the oven and its door with the door partially open, the collar engaging the oven and the door so as to form a seal between them, said collar being formed to define a hollow portion; and
    b. means in said collar hollow portion for establishing an electrical circuit between an electric heat sensor inside said oven and a temperature measuring circuit on said collar.

2. A device for adapting an existing oven having a rectangular door hinged along one edge of the oven opening to operate with an externally monitored electrical heat sensor in said oven, said device comprising:
    a. a U-shaped collar having a hollow transverse member dimensioned to extend along the edge of the oven opening opposite the edge along which said door is hinged and a pair of arms extending at right angles from said member and spaced apart to extend along opposite edges of said opening toward the edge along which said door is hinged, said arms being wedge shaped to fit between said oven and its door when the latter is slightly open, said collar engaging the door and the oven to form a seal between said oven and its door;
    b. said hollow transverse member including an inner hollow portion extending into the area normally occupied by the upper portion of a closed door on the oven without the collar and an outer hollow portion positioned adjacent the upper outer face of the door opening, the outer position defining the upper boundary of the space for receiving the door;
    c. a plurality of temperature sensors extending into said oven from the inner portion of said hollow transverse member;
    d. a plurality of display devices connected to said sensors and mounted in a wall of said outer hollow portion above the oven door; and
    e. circuit means mounted on the collar for actuating the display devices.

3. A self-contained temperature-monitoring system for an oven having a hinged door comprising in combination:

a. a collar shaped to fit between the front of the oven and its partially opened door with the collar engaging the oven and the door so as to form a heat sealing extension between them, the collar including a hollow portion extending outwardly from the door area;

b. an electrical temperature sensor extending into said oven from said collar hollow portion; and c. temperature-monitoring means mounted on said collar and electrically connected to said sensor.

4. A self-contained temperature-monitoring system in accordance with claim 3 wherein said door is hinged along a first edge of said oven opening and wherein said collar is comprised of:

a. a transverse member dimensioned to extend along a second edge of said oven opening opposite said first edge and formed to provide said hollow portion, and b. a pair of arms extending from said member and spaced apart to extend along opposite edges of said opening at right angles to said first edge.

5. A self-contained temperature-monitoring system in accordance with claim 4 wherein said monitoring system includes a display device mounted upon said transverse member and electrically connected to said temperature-monitoring means to indicate the temperature sensed by said temperature sensor, and electric circuitry for said monitoring means is mounted on a box along one side of the collar out of the path of the door with the upper portion of the box being in communication with one end of said hollow portion for electrical connections between the circuitry and the display device.

6. A self-contained temperature-monitoring system comprising in combination:

a. an oven having a door hinged along one edge and means urging the door into closed position;

b. a collar shaped to fit around three edges of the oven opening between the front of the oven and its partially open door, the collar being attached to the oven and the door being urged into engagement with the collar so as to form a seal between them;

c. a plurality of electrical temperature sensors attached to the collar and extending into said oven;

d. a plurality of display devices, each corresponding to a respective one of said sensors mounted on said collar outside of said oven; and e. circuit means mounted on the collar having a plurality of inputs individually connected to respective 7. A self-contained temperature-monitoring system in accordance with claim 6 and additionally including means responsive to said circuit for sounding an alarm when any of said indicating devices is actuated.

8. A self-contained temperature-monitoring system for an oven comprising in combination a. a U-shaped collar extending along three edges of the oven opening and formed to fit between the front of the oven and its partially open door with the collar engaging the oven and the door;

b. a plurality of electrical temperature sensors extending into said oven from said collar, each said sensor having a resistance whose value changes with temperature; temperature sensors extending into said oven from said collar each said sensor c. a plurality of indicators, each corresponding to a respective one of said temperature sensors, mounted in a hollow upper portion of said collar outside of said oven;

d. a plurality of monitoring circuits mounted integrally with said collar, each having 1. a bridge circuit of which a respective one of said temperature sensors is a part, 2. an amplifier connected to produce a signal proportional to the output of said bridge circuit, and 3. a threshold circuit connected between said amplifier and a respective one of said indicators for actuating said indicator when the output of said amplifier exceeds a preset limit.

9. A self-contained temperature-monitoring system in accordance with claim 8 and additionally including an audible alarm housed in said collar and responsive to the outputs of all of said threshold circuits for audibly indicating the output of any of said amplifiers exceeding said preset limit.

10. A self-contained temperature-monitoring circuit in accordance with claim 8 wherein each of said temperature sensors is individually sealed within a pointed metal probe.

11. An adapter for modifying an existing oven so as to enable it to operate with its door partially opened comprising:

a. a heat insulating collar shaped to fit between the opening of the oven and its partially open door, the collar engaging both the oven and the door so as to form a heat seal between them; and b. means for rigidly but removably clamping said collar against said oven opening.

12. The adapter of claim 11 wherein:

a. said door and said opening are rectangular and the door is hinged along one edge of the oven opening;

b. said collar is U-shaped, having 1. a transverse member dimensioned to extend along the edge of the oven opening along which said door is hinged, and 2. a pair of arms extending at right angles from said member and spaced apart to extend along opposite edges of said opening toward the edge along which said door is hinged, said transverse member and said arms having coplanar rear surfaces to cause said collar to be securely seated against the oven opening when clamped against said opening; and 3. said clamping means comprising bolts having their heads attached to the transverse member with the bolt shanks extending into the oven, a nut mounted on the end of each bolt, and an element on the bolt shank engaging an inner surface of a depending upper front wall portion of the oven to clamp the transverse member against the oven when the nuts are tightened on the bolts.

13. A method of converting an existing oven for operation with a temperature-monitoring circuit wherein temperature probes inside the oven are connected through a cable harness to temperature-indicating devices outside the oven, said method comprising:

a. removably fastening a collar between the opening of the oven and its partially open door with the collar engaging the oven and the door so as to form a seal between them, said collar having means defining a passage from the inside of said oven to the outside, and having the temperature indicating devices mounted thereon; and b. leading said cable harness from the inside of said oven through said passage to the outside of said oven.

PO-1050
(5/69)

UNITED STATES PATENT OFFICE
CERTIFICATE OF CORRECTION

Patent No. __3,611,336__    Dated __October 5, 1971__

Inventor(s) __Frank C. F. Chen__

It is certified that error appears in the above-identified patent and that said Letters Patent are hereby corrected as shown below:

Col. 1, line 52, "adapted" should be --adapter--;
Col. 3, line 40, "cu-touts" should be --cut-outs--;
Col. 5, line 6, "isolated" should be --isolation--;
Col. 6, lines 63 and 64, "position" should be --portion--;
Col. 7, line 46, after "respective" insert --ones of said sensors and a plurality of outputs individually connected to respective ones of said display devices for actuating each display device when the temperature sensed by its corresponding temperature sensor exceeds a preset limit.--
Col. 7, lines 59, 60 and 61, delete "temperature sensors extending into said oven from said collar each said sensor".

Signed and sealed this 25th day of April 1972.

(SEAL)
Attest:

EDWARD M. FLETCHER, JR.
Attesting Officer

ROBERT GOTTSCHALK
Commissioner of Patents